United States Patent
Song et al.

(10) Patent No.: US 6,207,320 B1
(45) Date of Patent: Mar. 27, 2001

(54) CAP ASSEMBLY OF SECONDARY BATTERY

(75) Inventors: Man-Gon Song, Chungchongnam-do; Ea-Joo Hwang, Kyonggi-do; Hyoung-Su Kim; Eung-Kil Choi, both of Chungchongnam-do, all of (KR)

(73) Assignee: Samsung Display Devices, Co., Ltd. (KR)

( * ) Notice: Subject to any disclaimer, the term of this patent is extended or adjusted under 35 U.S.C. 154(b) by 0 days.

(21) Appl. No.: 09/315,243

(22) Filed: May 20, 1999

(30) Foreign Application Priority Data

Jul. 28, 1998 (KR) .................................. 98-30287

(51) Int. Cl.⁷ ..................... H01M 2/00; H01M 2/12
(52) U.S. Cl. .................. 429/171; 429/175; 429/185; 429/163; 429/7; 429/61; 429/62; 429/82; 429/53; 429/56
(58) Field of Search ..................... 429/171, 175, 429/185, 163, 7, 61, 62, 82, 53, 56

(56) References Cited

U.S. PATENT DOCUMENTS 5,609,972 * 3/1997 Kaschmitter et al. ............... 429/56

FOREIGN PATENT DOCUMENTS

6215747 * 8/1994 (JP) .............................. H01M/2/12

\* cited by examiner

Primary Examiner—Stephen Kalafut
Assistant Examiner—Angela J. Martin
(74) Attorney, Agent, or Firm—Baker & McKenzie

(57) ABSTRACT

A battery includes a can filled with an electrolyte and an electrode assembly. A cap assembly is close-tightly mounted on an upper end of the can with a gasket interposed between the cap assembly and the upper end. The cap assembly comprises a plate provided with a safety groove, a current control member disposed on the plate, a cap cover disposed on the current control member, and a circuit breaker disposed under the plate and supported by a support plate. As a feature of the present invention, the circumferential edge of at least one of the plate, the current control member, and the cap cover is bent around the support plate.

6 Claims, 2 Drawing Sheets

CAP ASSEMBLY OF SECONDARY BATTERY

BACKGROUND OF THE INVENTION

1. Field of the Invention

The present invention relates to a secondary battery and, more particularly, to a cap assembly of a secondary battery, which is designed to seal the battery housing more effectively and thus prevent electrolyte from leaking.

2. Description of Related Art

Generally, secondary batteries are made compact in size and rechargeable, and yet have a large capacity. Well known as secondary batteries are a Ni—MH battery, a Li battery, and a Li-ion battery.

Particularly, the Li-ion battery uses lithium metal oxide as a positive active material and carbon or a carbon compound as a negative active material. An organic solvent in which lithium salt is dissolved is used as the electrolyte via which the lithium ions move between positive and negative electrodes. Batteries are charged and discharged as the lithium ions are moved between positive and negative electrodes.

FIG. 4 shows a conventional Li-ion battery.

A rolled electrode assembly 2 is inserted into a can 4 filled with electrolyte, the rolled electrode assembly 2 comprising of positive and negative electrodes and a separator disposed between the positive and negative electrodes. Mounted on an upper end of the can 4 is a cap assembly 6.

The cap assembly 6 is insulated from the can 4 by a gasket 8. That is, the upper end of the can 4 is crimped on an outer periphery of the cap assembly 6 with the gasket 8 in between. The cap assembly 6 comprises a plate 14 provided with a safety groove, a current control member 12 disposed on the plate 14, and a cap cover 10 disposed on the current control member 12. Attached under the plate 14 is a circuit breaker 18 with an insulator 16 disposed therebetween. The insulator 16 is supported by a support plate 17, which is designed to maintain its attaching state even when the circuit breaker 18 is detached from the plate 14.

The circuit breaker 18 is welded on a positive lead 20 so that it is electrically coupled to a positive electrode of the electrode assembly 2.

In the conventional Li-ion battery structured as described above, to enhance airtightness and prevent the electrolyte from leaking, the gasket 8 is designed to be compressed by a predetermined level of pressure. However, if the gasket 8 is mis-assembled, the degree of airtightness may degrade, thereby allowing the electrolyte to leak.

Particularly, in the case of a cylindrical Li-ion battery, airtightness depends on the contacting area between the plate 14 and the gasket 8. However, in the conventional battery, the contacting area is insufficient and the housing may be not airtight.

SUMMARY OF THE INVENTION

Therefore, the present invention has been made in an effort to solve the above-described problems.

It is an objective of the present invention to provide a cap assembly of a secondary battery, which can enhance airtightness of the battery housing by providing an enlarged contacting area with a gasket and thus prevent electrolyte leakage.

To achieve the above objective, the present invention provides a cap assembly for a battery comprising a can filled with an electrolyte and an electrode assembly. The cap assembly is close-tightly mounted on an upper end of the can with a gasket interposed between the cap assembly and the upper end of the can. The cap assembly comprises a plate provided with a safety groove, a current control member disposed on the plate, a cap cover disposed on the current control member, and a circuit breaker disposed under the plate and supported by a support plate.

As a feature of the present invention, the circumferential edge of at least one of the plate, the current control member, and the cap cover of the cap assembly is bent around the support plate.

The cap assembly may further comprise an insulator disposed between the plate and the circuit breaker. The insulator is fixed by the support plate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer the same or like parts.

Figure 1:
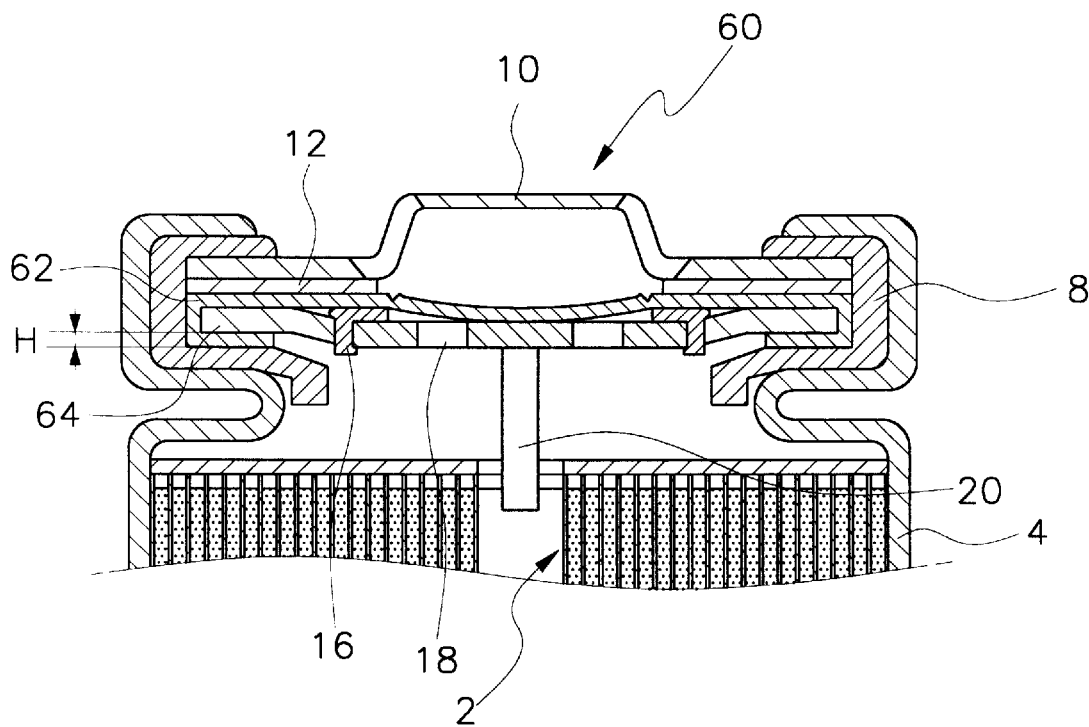
FIG. 1 is a partial sectional view illustrating a secondary battery where a cap assembly according to a preferred embodiment of the present invention is employed.

FIG. 1 shows a cap assembly of a battery according to a preferred embodiment of the present invention.

A rolled electrode assembly 2 is inserted into a can 4 filled with electrolyte, the rolled electrode assembly 2 comprising positive and negative electrodes and a separator disposed between the positive and negative electrodes. Mounted on an upper end of the can 4 is an inventive cap assembly 60.

The inventive cap assembly 60 is insulated from the can 4 by a gasket 8. That is, the upper end of the can 4 is crimped on an outer periphery of the cap assembly 60 with the gasket 8 interposed in between. The cap assembly 60 comprises a plate 62 provided with a safety groove, a current control member 12 disposed on the plate 62, and a cap cover 10 disposed on the current control member 12. Attached under the plate 62 is a circuit breaker 18 with an insulator 16 disposed therebetween. The circuit breaker 18 is supported by a support plate 64. The insulator 16 is fixed by the support plate 64.

As a feature of the invention, the plate 62 is bent around the circumferential periphery of the support plate 64 to fixedly hold the support plate 64.

Describing more in detail with reference to FIG. 1, the plate 62 is disposed on the support plate 64 and is bent around the circumferential periphery of the support plate 64. Therefore, the contacting area between the cap assembly 10 and the gasket 8 is increased by a bent height H, which translated into increased airtightness of the battery housing.

While this invention has been described in connection with what is presently considered to be the most practical and preferred embodiment it is to be understood that the invention is not limited to the disclosed embodiments, but, on the contrary, is intended to cover various modifications and equivalent arrangements included within the spirit and scope of the appended claims.

Figure 2:
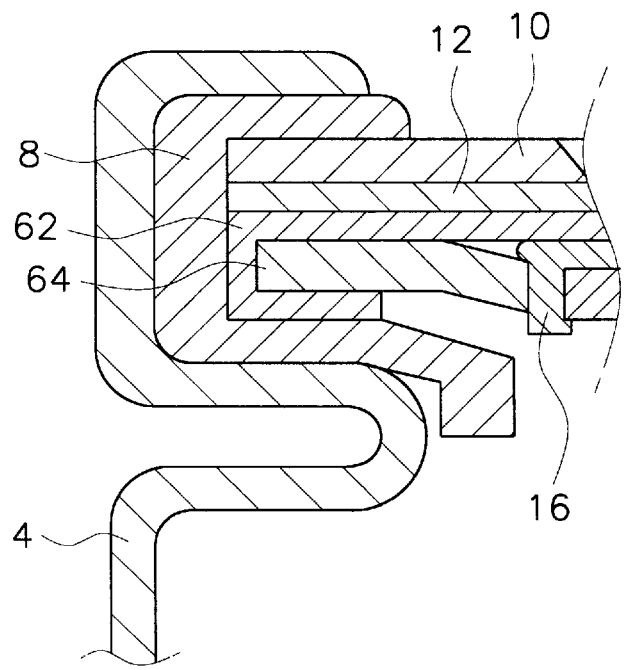
FIGS. 2 and 3 are an enlarged view of a major portion of a cap assembly according to another preferred embodiment of the present invention.

For example, as shown in FIG. 2, the current control member 12 may bend around the circumferential periphery of the support plate 64, thereby increasing the contacting area between the gasket 8 and the cap assembly 60.

Figure 3:
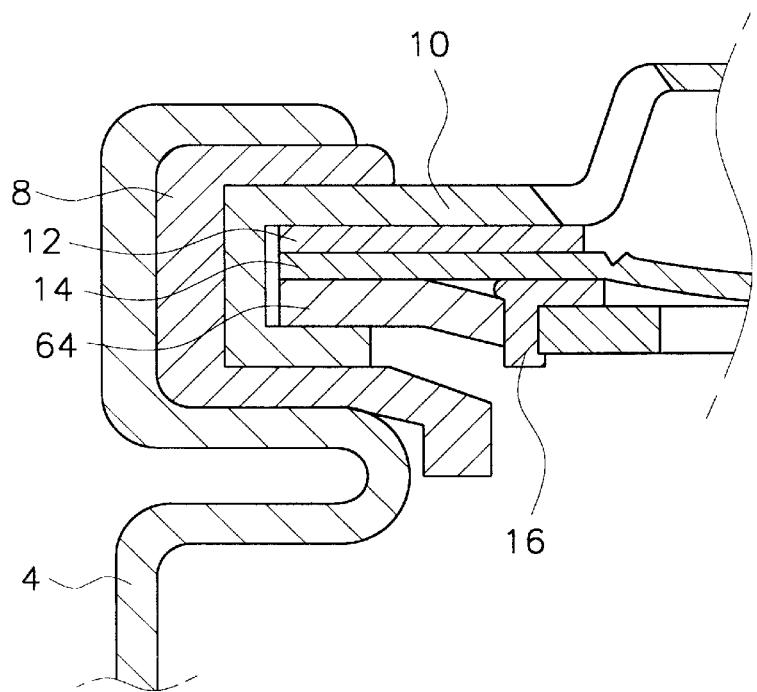
Figure 4:
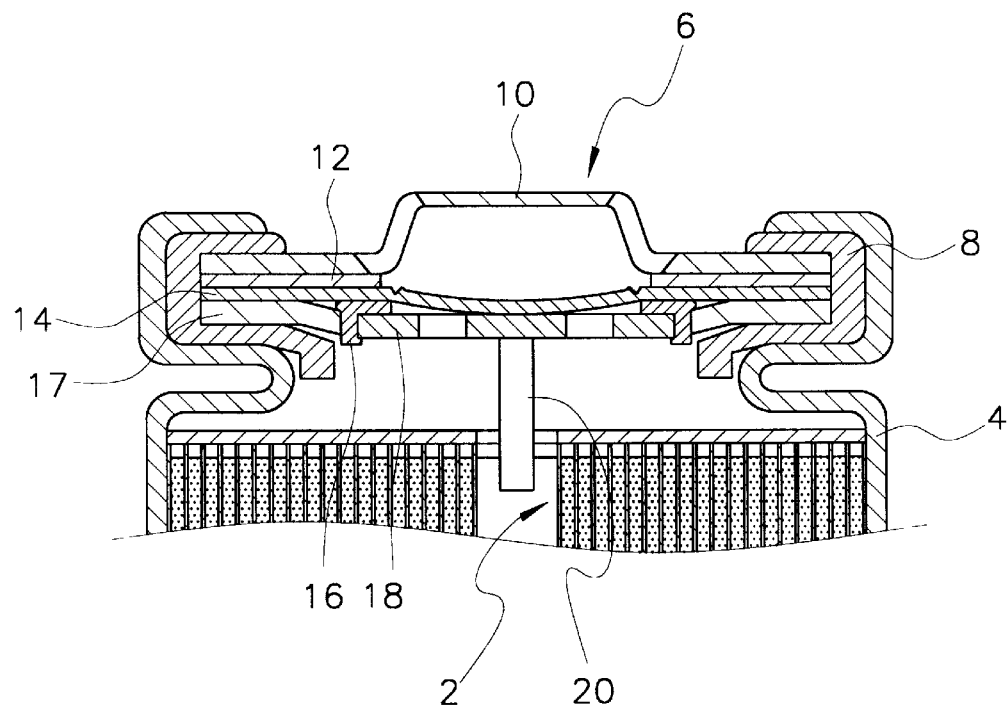
FIG. 4 is a sectional view of a conventional battery.

In addition, as shwon in FIG. 3, the cap cover 10 may be designed to enclose all the peripheries of the current control member 12, the plate 62 and the support plate 64. However, in this case, since the cap cover 10 and the plate 62 should not be electrically coupled, a insulating material is disposed therebetween.

What is claimed is:

1. A cap assembly for a battery comprising a can filled with an electrolyte and an electrode assembly, the cap assembly being mounted on an upper end of the can with a gasket interposed between the cap assembly and the upper end, said cap assembly comprising:

a plate provided with a safety groove;

a current control member disposed on the plate;

a cap cover disposed on the current control member; and a circuit breaker disposed under the plate and supported by a support plate;

wherein the circumferential edge of at least one of the plate, the current control member, and the cap cover is bent around the support plate.

2. The cap assembly of claim 1 further comprising an insulator disposed between the plate and the circuit breaker.

3. The cap assembly of claim 2 wherein the insulator is captured by the support plate.

4. The cap assembly of claim 1 wherein the circumferential edge of the plate is bent around the support plate.

5. The cap assembly of claim 1 wherein the circumferential edge of the current control member is bent around the support plate.

6. The cap assembly of claim 1 wherein the circumferential edge of the cap cover is bent around the support plate.

* * * * *